(12) United States Patent
Miura

(10) Patent No.: US 8,205,993 B2
(45) Date of Patent: Jun. 26, 2012

(54) PROJECTION-TYPE IMAGE DISPLAYING APPARATUS

(75) Inventor: Toru Miura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 11/671,277

(22) Filed: Feb. 5, 2007

(65) Prior Publication Data
US 2007/0182935 A1     Aug. 9, 2007

(30) Foreign Application Priority Data
Feb. 7, 2006   (JP) .................................. 2006-030082

(51) Int. Cl.
*G03B 21/18*     (2006.01)
(52) U.S. Cl. .......................................... 353/57; 353/58
(58) Field of Classification Search ............... 353/57–61
See application file for complete search history.

(56) References Cited

U.S. PATENT DOCUMENTS

| | | | | |
|---|---|---|---|---|
| 6,471,357 | B1 * | 10/2002 | Hara et al. | 353/57 |
| 6,844,979 | B2 * | 1/2005 | Maki et al. | 359/629 |
| 6,966,655 | B2 * | 11/2005 | Hara et al. | 353/61 |
| 7,040,763 | B2 * | 5/2006 | Shiraishi et al. | 353/60 |
| 7,152,979 | B2 * | 12/2006 | Ellis et al. | 353/60 |
| 2007/0008496 | A1 * | 1/2007 | Seki | 353/60 |
| 2007/0008497 | A1 * | 1/2007 | Ellis et al. | 353/61 |

FOREIGN PATENT DOCUMENTS

| | | |
|---|---|---|
| JP | 11-231418 A | 8/1999 |
| JP | 2000-122024 A | 4/2000 |
| JP | 2002-174855 | 6/2002 |
| JP | 2002174855 A * | 6/2002 |
| JP | 2004-126421 A | 4/2004 |
| JP | 2004-126421 | 2/2007 |

* cited by examiner

*Primary Examiner* — Que T Le
*Assistant Examiner* — Jerry Brooks
(74) *Attorney, Agent, or Firm* — Canon USA Inc IP Division

(57) ABSTRACT

A projection-type image displaying apparatus takes in outside air through an air inlet formed in a housing unit to cool at least one of an optical modulator and an optical element that are accommodated in the housing unit, the optical modulator forming an optical image and the optical element being disposed between the optical modulator and a light source. The projection-type image displaying apparatus includes a cooling fan, a first dustproof filter disposed at the air inlet of the housing unit, a second dustproof filter disposed in a flow path that guides the outside air toward the optical modulator or the optical element after the outside air passes through the first dustproof filter and the cooling fan, and a holder for holding the optical modulator or the optical element, the holder having an outside-air introducing portion, wherein the second dustproof filter is attachable to the outside-air introducing portion.

6 Claims, 7 Drawing Sheets

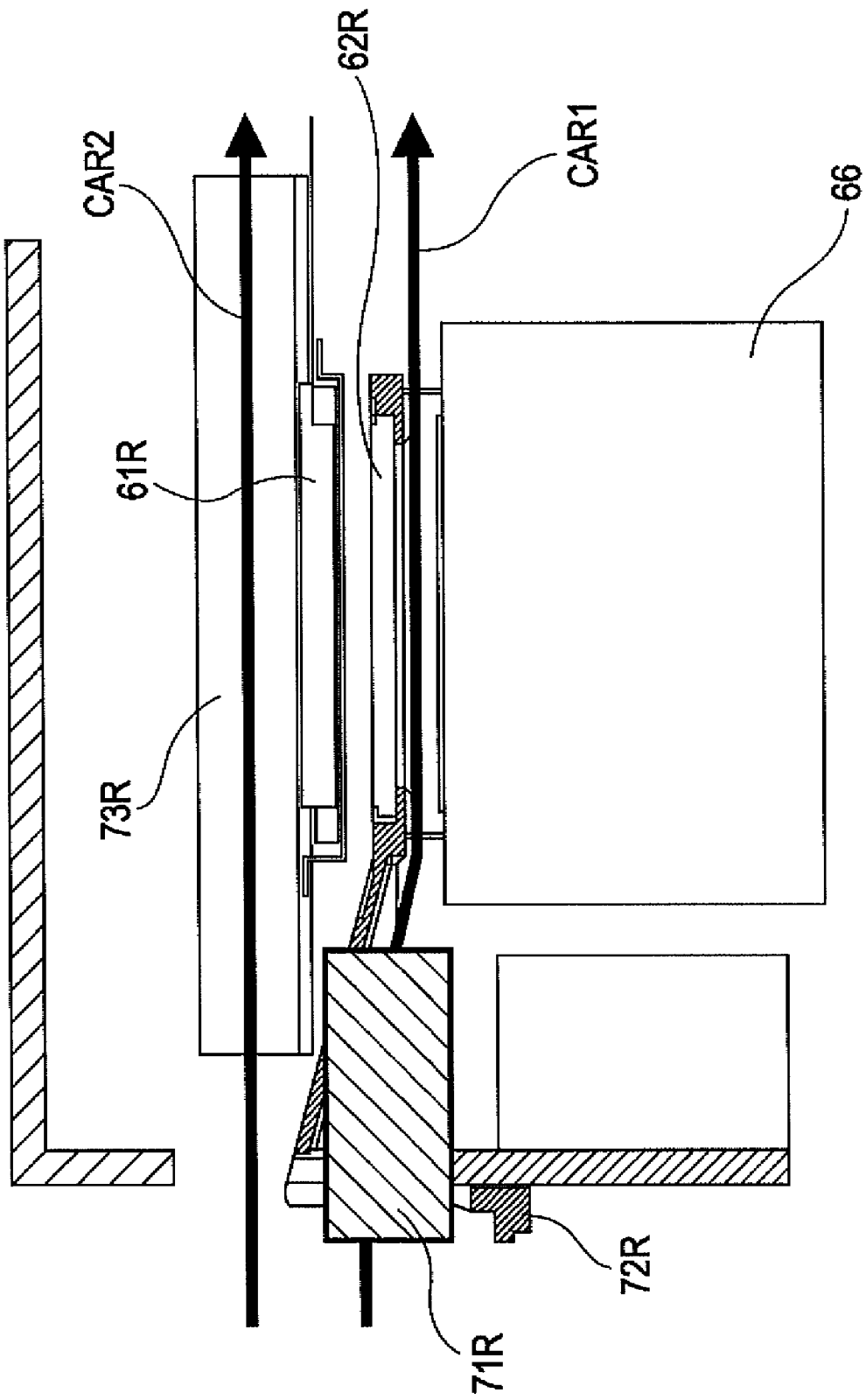

PROJECTION-TYPE IMAGE DISPLAYING APPARATUS

BACKGROUND OF THE INVENTION

1. Field of the Invention

The present invention relates to a projection-type image displaying apparatus including a dustproof unit for preventing dust from entering the apparatus.

2. Description of the Related Art

Recently, the definition of projection-type image displaying apparatuses has been increasing. In such a high-definition image displaying apparatus, noticeable degradation of image quality occurs even if a small amount of dust is carried by cooling air supplied from a cooling unit and adheres to an optical modulator or an optical element disposed near the optical modulator.

Accordingly, a dustproof filter is provided at an air inlet of the cooling air to prevent dust from entering the apparatus. To substantially completely remove dust by the filter, the filter must have a fine mesh. However, when a filter having an extremely fine mesh is used, the filter functions as a resistance to airflow and accordingly the temperature of the overall apparatus is increased. This also leads to degradation of the image quality.

In addition, the dustproof filter becomes clogged with dust as the apparatus is used. Therefore, it is necessary to replace or clean the dustproof filter.

Japanese Patent Laid-Open No. 2002-174855 discusses a structure that can increase the dust collection efficiency. In this structure, a first filter that is cleanable and a second filter that includes a charging member are provided at an air inlet of cooling air. However, in this structure, the first filter and the second filter are disposed outside a cooling fan, which functions as a cooling unit. Therefore, there is a risk that the dust existing in the cooling fan and in a duct that extends from the cooling fan to an optical modulator will adhere to the optical modulator or an optical element disposed near the optical modulator in the duct.

In addition, to replace the second filter with another filter, it is necessary to detach the first filter that is disposed in front of the second filter. Therefore, both of the filters are removed in the process of replacing the second filter, and there is a risk that dust will enter the apparatus during this process.

In addition, Japanese Patent Laid-Open No. 2004-126421 discusses a structure in which dustproof filters are disposed at an air inlet of the cooling fan and in a flow path between the cooling fan and an optical element.

SUMMARY OF THE INVENTION

The present invention is directed to a projection-type image displaying apparatus. According to one aspect of the present invention, a projection-type image displaying apparatus takes in outside air through an air inlet provided in a housing unit to cool at least one of an optical modulator and an optical element that are accommodated in the housing unit with the outside air, the optical modulator forming an optical image and the optical element being disposed between the optical modulator and a light source. The projection-type image displaying apparatus includes a cooling fan facilitating introduction of the outside air through the air inlet; a first dustproof filter disposed at the air inlet of the housing unit; a second dustproof filter disposed in a flow path that guides the outside air toward the optical modulator or the optical element after the outside air passes through the first dustproof filter and the cooling fan; and a holder holding the optical modulator or the optical element, the holder having an outside-air introducing portion, wherein the second dustproof filter is attached to the outside-air introducing portion.

According to the present invention, resistance to airflow at the air inlet for the external cooling air can be reduced without degrading dustproof performance for preventing dust from adhering to components that directly affect the image quality.

Further features of the present invention will become apparent from the following description of exemplary embodiments with reference to the attached drawings.

BRIEF DESCRIPTION OF THE DRAWINGS

FIG. 6A illustrates a filter for a cooling-air blowing hole, which functions as a second dustproof filter, and airflows at the upstream and downstream of the filter.

DESCRIPTION OF THE EMBODIMENTS

Figure 1:
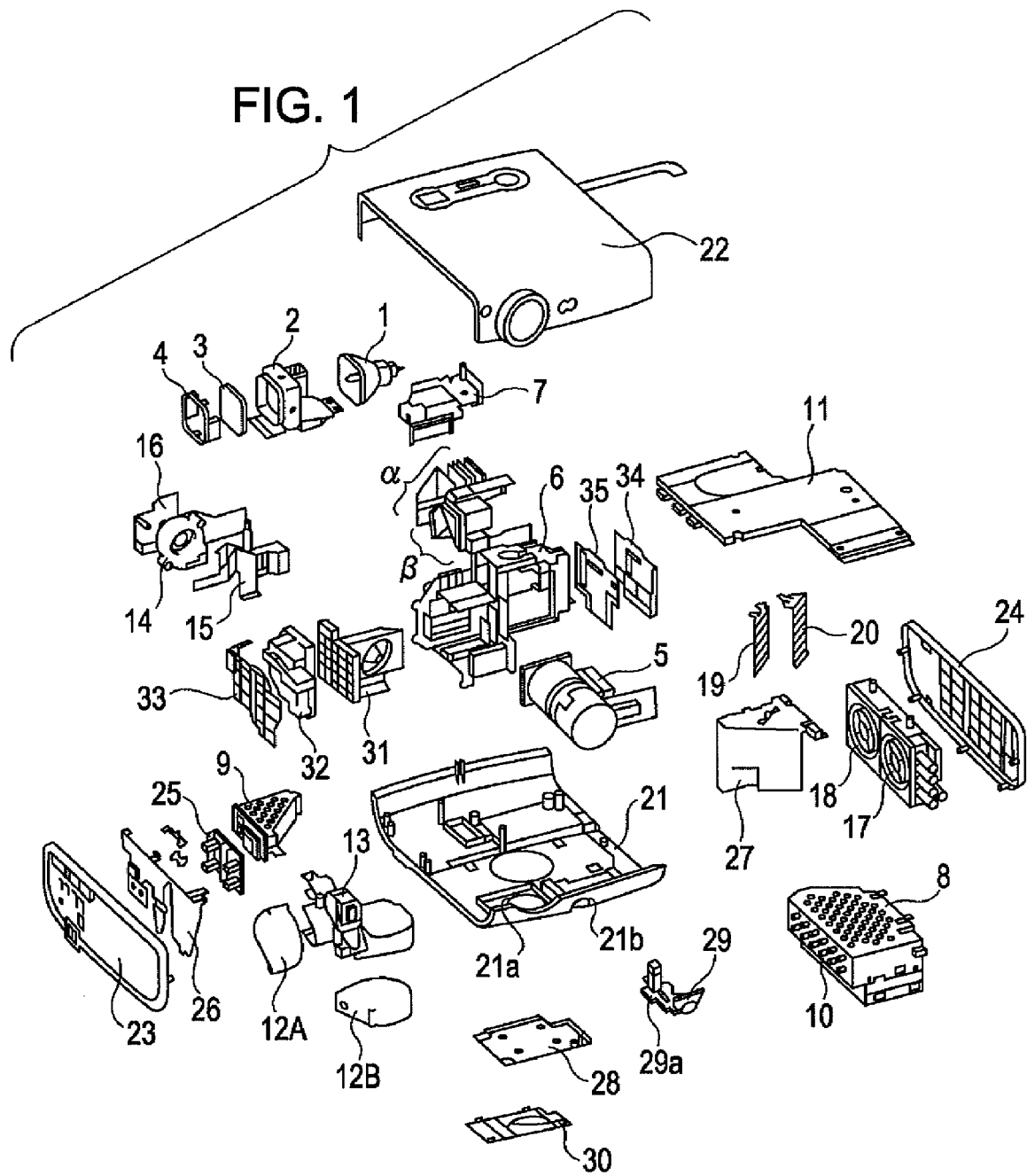
FIG. 1 illustrates a projection-type image displaying apparatus according to an embodiment of the present invention.

FIG. 1 is an exploded perspective view illustrating the structure of a projection-type image displaying apparatus according to an embodiment of the present invention.

The structure includes a first light source lamp 1, a lamp holder 2 for holding the lamp 1, an explosion-proof glass 3, a glass holder 4, an illumination optical system α that receives light from the lamp 1, and a color separating/combining optical system β that receives light output from the illumination optical system α and includes red (R), green (G), and blue (B) liquid crystal panels.

A projection lens barrel 5 receives light output from the color separating/combining optical system β and projects an image on a screen (projection plane), which is not shown in the figure. The projection lens barrel 5 supports a projection-lens optical system, which will be described below.

An optical box 6 stores the first light source lamp 1, the illumination optical system α, the color separating/combining optical system β, etc. In addition, the projection lens 5 is fixed to the optical box 6. In addition, the optical box 6 has a lamp casing that functions as a lamp-surrounding member for covering the first light source lamp 1.

An optical box cover 7 covers the optical box 6 while the illumination optical system α, the color separating/combining optical system β, etc., are housed in the optical box 6.

The structure also includes a power source 8, a power source filter 9, and a ballast power source 10 that is integrated with the power source 8 for turning on the first light source lamp 1.

A circuit board 11 is provided for transmitting commands for driving the liquid-crystal panels and turning on the lamp 1 with power supplied from the power source 8.

A first optical-system cooling fan 12A and a second optical-system cooling fan 12B take in air through an air inlet 21a formed in an exterior cabinet 21, which will be described below, to cool optical devices, such as the liquid-crystal panels, in the color separating/combining optical system β.

A first RGB duct 13 guides the air from the cooling fans 12A and 12B toward the optical devices, such as the liquid-crystal panels, in the color separating/combining optical system β.

A light-source lamp cooling fan 14 blows air toward the first light source lamp 1 to cool the lamp 1.

A first lamp duct 15 retains the lamp cooling fan 14 and guides the cooling air toward the lamp 1. A second lamp duct 16 holds the cooling fan 14 and is integrated with the first lamp duct 15 to form a duct unit.

A power-source cooling fan 17 takes in air through an air inlet 21b formed in the exterior of the cabinet 21, which will be described below, and causes the air to flow through the power source 8 and the ballast power source 10, thereby cooling the power source 8 and the ballast power source 10 simultaneously.

An exhaust fan 18 discharges the hot air after the air is caused to pass through the lamp 1 by the lamp cooling fan 14.

A first lamp exhaust louver 19 and a second lamp exhaust louver 20 have a light-shielding function so that light from the lamp 1 does not leak out of the apparatus.

The exterior cabinet (lower casing section) 21 houses the optical box 6, etc., and an exterior-cabinet cover (upper casing section) 22 covers the exterior cabinet 21 while the optical box 6, etc., are housed in the exterior cabinet 21.

In addition, a first side plate 23 and a second side plate 24 are provided. The exterior cabinet 21 has the above-mentioned air inlets 21a and 21b, and the second side plate 24 has an air outlet.

An interface substrate 25 has connectors for receiving various signals mounted thereon and an interface-reinforcing plate 26 is attached to an inner surface of the first side plate 23.

A lamp exhaust box 27 guides the exhaust heat from the lamp 1 to the exhaust fan 18 so that the exhaust air is prevented from diffusing in the apparatus. The lamp exhaust box 27 retains the first lamp exhaust louver 19 and the second lamp exhaust louver 20.

A lamp cover 28 is detachably attached to the bottom surface of the exterior cabinet 21, and is fixed with screws (not shown).

A set adjusting leg 29 is fixed to the exterior cabinet 21. The set adjusting leg 29 has a leg portion 29a whose height is adjustable, and an inclination angle of the apparatus body can be adjusted by adjusting the height of the leg portion 29a.

An RGB intake plate 30 is provided for holding a filter (not shown) that is attached outside the air inlet 21a in the exterior cabinet 21.

A prism base 31 retains the color separating/combining optical system β. A box side cover 32 has a duct-shaped portion for guiding the cooling air supplied from the first and second cooling fans 12A and 12B toward optical elements and reflective liquid-crystal display devices included in the color separating/combining optical system β.

A second RGB duct 33 is integrated with the box side cover 32 to form a duct unit.

An RGB board 34 is connected to the circuit board 11 and flexible printed circuits (FPC) that extend from the reflective liquid-crystal display devices included in the color separating/combining optical system β.

An RGB board cover 35 functions to prevent electric noise from affecting the RGB board 34.

The projection-type image displaying apparatus including the reflective liquid-crystal display devices (image-forming devices such as reflective liquid-crystal panels) will be described below. As described above, the projection-type image displaying apparatus includes the lamp 1, the illumination optical system α, the color separating/combining optical system β, and the projection lens 5.

Figure 2:
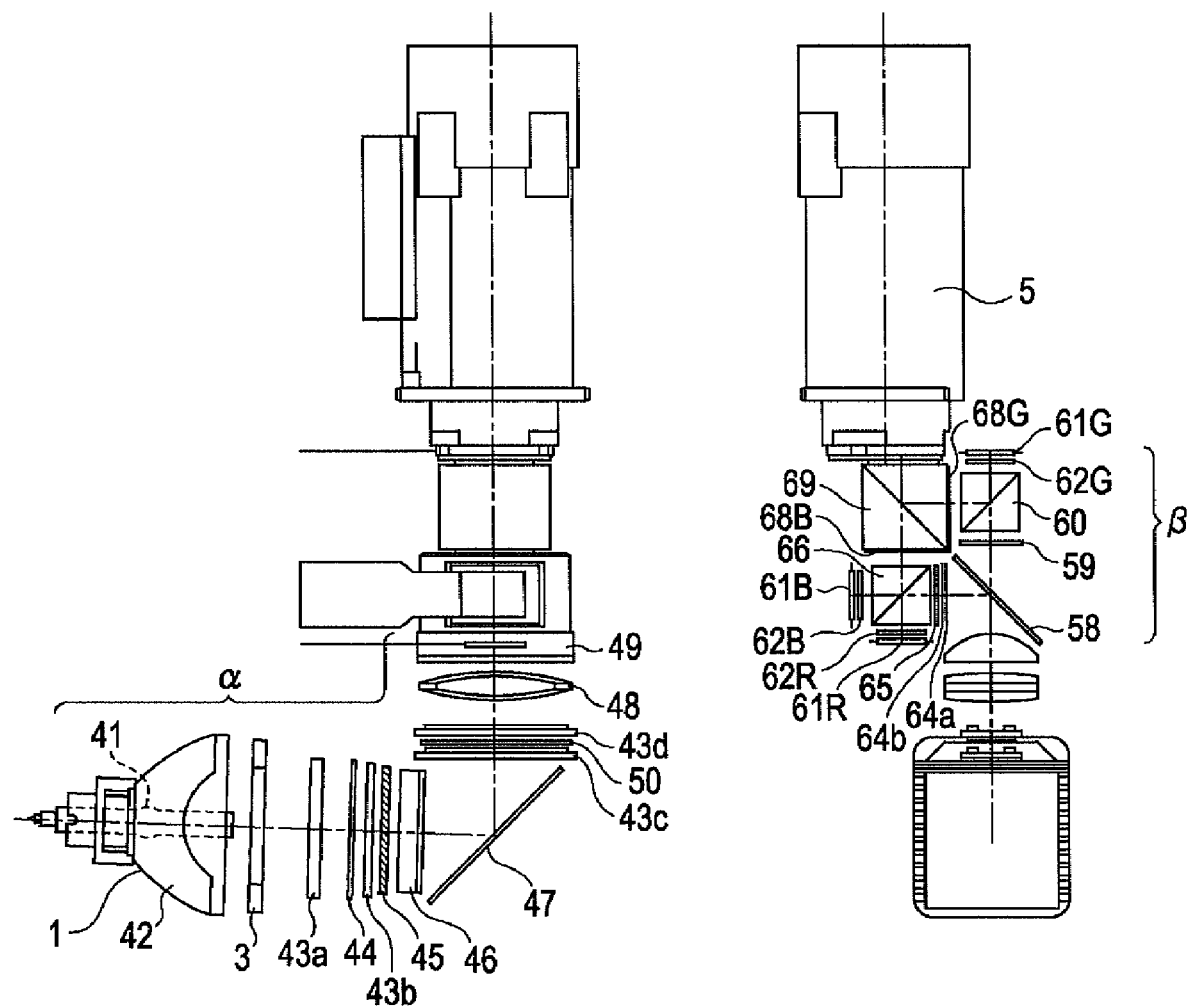
FIG. 2 illustrates the optical structure of the projection-type image displaying apparatus according to the embodiment in which reflective liquid-crystal display devices are mounted.

FIG. 2 illustrates the optical structure of the projection-type image displaying apparatus.

An arc tube 41 emits continuous spectrum white light, and a reflector 42 condenses the light emitted from the arc tube 41 in a predetermined direction. The arc tube 41 and the reflector 42 form the lamp 1.

A first cylinder array 43a is a lens array having a refractive power in a horizontal direction with respect to the direction in which the light travels from the lamp 1, that is, the direction perpendicular to the page in FIG. 2.

A second cylinder array 43b is a lens array including lenses corresponding to respective lenses in the first cylinder array 43a.

An ultraviolet filter 44 absorbs ultraviolet light, and a polarization conversion element 45 converts unpolarized light into light having a predetermined polarization.

A front compressor 46 includes a cylindrical lens having a refractive power in a vertical direction, and a total reflection mirror 47 changes the direction of the light axis by 88°.

A third cylinder array 43c is a lens array having a refractive power in a vertical direction with respect to the direction in which the light travels from the lamp 1, that is, the direction perpendicular to the page in FIG. 2.

A fourth cylinder array 43d is a lens array including lenses corresponding to respective lenses in the third cylinder array 43c.

A color filter 50 returns light with a certain color that corresponds to a specific wavelength band to adjust a chromatic coordinate to a predetermined value. A condenser lens 48 condenses light, and a rear compressor 49 includes a cylindrical lens having a refractive power in the vertical direction.

The illumination optical system α is constituted by the above-mentioned components.

A dichroic mirror 58 reflects light in blue (B) and red (R) wavelength bands and transmits light in a green (G) wavelength band. A G-light entrance polarizer 59, which is formed by adhering a polarizing element to a transparent substrate, transmits only P-polarized light. A first polarizing beam splitter 60 transmits P-polarized light and reflects S-polarized light with a polarized-beam separation surface.

Red (R), green (G), and blue (B) reflective liquid-crystal display devices 61R, 61G, and 61B reflect incident light and perform image modulation. In addition, red (R), green (G), and blue (B) quarter-wave plates 62R, 62G, and 62B are provided. A trimming filter 64a returns orange light to the lamp 1 to increase the color purity of red. An RB-light entrance polarizer 64b, which is formed by adhering a polarizing element to a transparent substrate, transmits only P-polarized light. A color selective retardation plate 65 changes the direction of polarization of R light by 90° without changing the direction of polarization of B light. A second polarizing beam splitter 66 transmits P-polarized light and reflects S-polarized light with a polarized-beam separation surface.

A B exit polarizer (polarizing element) 68B rectifies only blue S-polarized light, and a G exit polarizer (polarizing element) 68G rectifies only S-polarized light. A dichroic prism 69 transmits R light and B light and reflects G light.

The color separating/combining optical system β is constituted by the above-described components from the dichroic mirror 58 to the dichroic prism 69.

The definition of P-polarized light and S-polarized light will be described below. The polarization conversion element 45 converts the P-polarized light into S-polarized light. Here, the P-polarized light and the S-polarized light are defined with reference to the polarization conversion element 45.

However, the polarization of light incident on the dichroic mirror 58 is defined with reference to the polarizing beam splitters 60 and 66. Therefore, it is determined that P-polarized light is incident on the dichroic mirror 58.

Thus, although S-polarized light is output from the polarization conversion element 45, it is defined in the present embodiment that the S-polarized light output from the polarization conversion element 45 is incident on the dichroic mirror 58 as P-polarized light.

The optical operation will be described below. Light emitted from the arc tube 41 is condensed in the predetermined direction by the reflector 42.

The reflector 42 has a paraboloid shape, and light supplied from the focus of the paraboloid is changed into light parallel to the axis of symmetry of the paraboloid. However, since the light source of the arc tube 41 is not an ideal point light source and has a finite size, the condensed light includes many components that are not parallel to the axis of symmetry of the paraboloid.

The thus-condensed light is incident on the first cylinder array 43a, and is divided into a plurality of light beams corresponding to the cylinder lenses included in the first cylinder array 43a. The light beams are condensed to form band-shaped light beams extending in the vertical direction.

The light beams (band-shaped light beams extending in the vertical direction) pass through the ultraviolet filter 44 and the second cylinder array 43b, and are incident on the polarization conversion element 45.

The polarization conversion element 45 includes a polarized-beam separation surface, a reflective surface, and a half-wave plate. Each of the light beams is incident on the corresponding polarized-beam separation surface and is divided into a P-polarized light component that passes through the polarized-beam separation surface and an S-polarized light component that is reflected by the polarized-beam separation surface.

The S-polarized light component reflected by the polarized-beam separation surface is reflected by the reflective surface and is output in the same direction as the P-polarized light component.

The P-polarized light component that passes through the polarized-beam separation surface is caused to pass through the half-wave plate and is converted into S-polarized light component. Thus, light having a uniform polarization direction is output.

The light beams (band-shaped light beams extending in the vertical direction) having a uniform polarization direction that are output from the polarization conversion element 45 pass through the front compressor 46 and are reflected at 88° by the reflective mirror 47. Then, the light beams are incident on the third cylinder array 43c.

The light beams incident on the third cylinder array 43c are each divided into a plurality of light beams corresponding to the cylinder lenses included in the third cylinder array 43c. The thus-divided light beams are condensed to form band-shaped light beams extending in the horizontal direction, and are caused to pass through the fourth cylinder array 43d.

Then, the light beams pass through the condenser lens 48 and reach the rear compressor 49.

Due to the optical functions of the front compressor 46, the condenser lens 48, and the rear compressor 49, the light beams form a uniform rectangular illumination area in which rectangular images are superimposed on one another.

The reflective liquid-crystal display devices 61R, 61G, and 61B, which will be described below, are disposed at positions corresponding to the illumination area.

The S-polarized light output from the polarization conversion element 45 is incident on the dichroic mirror 58. The dichroic mirror 58 reflects B light (430 nm to 495 nm) and R light (590 nm to 650 nm) and transmits G light (505 nm to 580 nm).

An optical path of G light will be described below. G light passes through the dichroic mirror 58 and is incident on the G-light entrance polarizer 59. At this time, G light output from the dichroic mirror 58 remains P-polarized (S-polarized with reference to the polarization conversion element 45).

Then, G light is output from the G-light entrance polarizer 59, is incident on the first polarizing beam splitter 60 as P-polarized light, passes through the polarized-beam separation surface of the first polarizing beam splitter 60, and reaches the G reflective liquid-crystal display device 61G.

The G reflective liquid-crystal display device 61G performs image modulation of G light and reflects G light. Then, a P-polarized component of the image-modulated G light passes through the polarized-beam separation surface of the first polarizing beam splitter 60 again and returns to the light source, thereby being removed from projection light.

An S-polarized component of the image-modulated G light is reflected by the polarized-beam separation surface of the first polarizing beam splitter 60, and thereby travels toward the dichroic prism 69 as projection light.

The slow axis of the quarter-wave plate 62G placed between the first polarizing beam splitter 60 and the G reflective liquid-crystal display device 61G is adjusted to a predetermined direction in the state in which all of the light components are P-polarized (state in which black display is presented). Accordingly, the influence of variation in the state of polarization caused by the first polarizing beam splitter 60 and the G reflective liquid-crystal display device 61G can be reduced.

G light output from the first polarizing beam splitter 60 is incident on the third polarizing beam splitter 69 as S-polarized light, is reflected by a dichroic film in the dichroic prism 69, and is output toward the projection lens 5.

Next, optical paths of R light and B light will be described. R light and B light are reflected by the dichroic mirror 58 and are incident on the entrance polarizer 64b. At this time, R light and B light output from the dichroic mirror 58 remain P-polarized.

Orange light is removed from R light and B light by the trimming filter 64a. Then, R light and B light are output from the entrance polarizer 64b and are incident on the color selective retardation plate 65.

The color selective retardation plate 65 rotates the direction of polarization of only R light by 90°. Accordingly, R light and B light are incident on the second polarizing beam splitter 66 as S-polarized light and P-polarized light, respectively.

Thus, R light is incident on the second polarizing beam splitter 66 as S-polarized light, is reflected by the polarized-beam separation surface of the second polarizing beam splitter 66, and reaches the R reflective liquid-crystal display device 61R. B light is incident on the second polarizing beam splitter 66 as P-polarized light, passes through the polarized-beam separation surface of the second polarizing beam splitter 66, and reaches the B reflective liquid-crystal display device 61B.

The R reflective liquid-crystal display device 61R performs image modulation of R light and reflects R light. An S-polarized component of the image-modulated R light is reflected by the polarized-beam separation surface of the second polarizing beam splitter 66 and returns to the light source, thereby being removed from projection light.

A P-polarized component of the image-modulated R light passes through the polarized-beam separation surface of the second polarizing beam splitter 66, and thereby travels toward the dichroic prism 69 as projection light.

The B reflective liquid-crystal display device 61B performs image modulation of B light and reflects B light. A P-polarized component of the image-modulated B light passes through the polarized-beam separation surface of the second polarizing beam splitter 66 again and returns to the light source, thereby being removed from projection light.

An S-polarized component of the image-modulated B light is reflected by the polarized-beam separation surface of the second polarizing beam splitter 66, and thereby travels toward the dichroic prism 69 as projection light.

The slow axes of the quarter-wave plates 62R and 62B that are respectively placed between the second polarizing beam splitter 66 and the R reflective liquid-crystal display device 61R and between the second polarizing beam splitter 66 and the B reflective liquid-crystal display device 61B are adjusted. Thus, similar to G light, adjustment of black display can be performed for R light and B light.

Thus, R projection light and B projection light are combined and are output from the second polarizing beam splitter 66 as a single light beam. Then, B projection light in the combined light beam is analyzed by the exit polarizer 68B and is incident on the dichroic prism 69.

In addition, R projection light, which is P-polarized, passes through the polarizer 68B and is incident on the dichroic prism 69.

The exit polarizer 68B converts B projection light into light that is free from ineffective components that are generated when B light passes through the second polarizing beam splitter 66, the B reflective liquid-crystal display device 61B, and the quarter-wave plate 62B.

R projection light and B projection light that are incident on the dichroic prism 69 pass through the dichroic film in the dichroic prism 69 and are combined with G light that is reflected by the dichroic film. The thus combined light is incident on the projection lens 5.

The light obtained by combining R projection light, G projection light, and B projection light is projected onto a projection plane, such as a screen, by the projection lens 5.

The above-described optical paths are established when white display is presented by the reflective liquid-crystal display devices. Optical paths established when black display is presented by the reflective liquid-crystal display devices will be described below.

First, an optical path of G light will be described. P-polarized G light passes through the dichroic mirror 58 and is incident on the entrance polarizer 59. Then, G light is incident on the first polarizing beam splitter 60, passes through the polarized-beam separation surface of the first polarizing beam splitter 60, and reaches the G reflective liquid-crystal display device 61G.

However, since the reflective liquid-crystal display device 61G presents black display, G light is reflected without being image-modulated.

Accordingly, G light remains P-polarized after being reflected by the reflective liquid-crystal display device 61G. Therefore, G light passes through the polarized-beam separation surface of the first polarizing beam splitter 60 and the entrance polarizer 59 and returns toward the light source, thereby being removed from the projection light.

Next, optical paths of R light and B light will be described below. P-polarized R light and B light are reflected by the dichroic mirror 58 and are incident on the entrance polarizer 64b.

Then, R light and B light are output from the entrance polarizer 64b and are incident on the color selective retardation plate 65.

The color selective retardation plate 65 rotates the direction of polarization of only R light by 90°. Accordingly, R light and B light are incident on the second polarizing beam splitter 66 as S-polarized light and P-polarized light, respectively.

Thus, R light is incident on the second polarizing beam splitter 66 as S-polarized light, is reflected by the polarized-beam separation surface of the second polarizing beam splitter 66, and reaches the R reflective liquid-crystal display device 61R. B light is incident on the second polarizing beam splitter 66 as P-polarized light, passes through the polarized-beam separation surface of the second polarizing beam splitter 66, and reaches the B reflective liquid-crystal display device 61B.

However, since the R reflective liquid-crystal display device 61R presents black display, R light incident thereon is reflected without being image-modulated.

Accordingly, R light remains S-polarized after being reflected by the R reflective liquid-crystal display device 61R. Therefore, R light is reflected by the polarized-beam separation surface of the second polarizing beam splitter 66 again, passes through the entrance polarizer 64b, and returns toward the light source, thereby being removed from the projection light. Thus, black display is presented.

Similarly, since the B reflective liquid-crystal display device 61B presents black display, B light incident thereon is reflected without being image-modulated.

Accordingly, B light remains P-polarized after being reflected by the B reflective liquid-crystal display device 61B. Therefore, B light passes through the polarized-beam separation surface of the second polarizing beam splitter 66 again.

Then, B light passes through the color selective retardation plate 65, which converts B light into S-polarized light, and the entrance polarizer 64b, and returns toward the light source, thereby being removed from the projection light.

The projection-type image displaying apparatus including the reflective liquid-crystal display devices (reflective liquid-crystal panels) have the above-described optical structure.

Figure 3A:
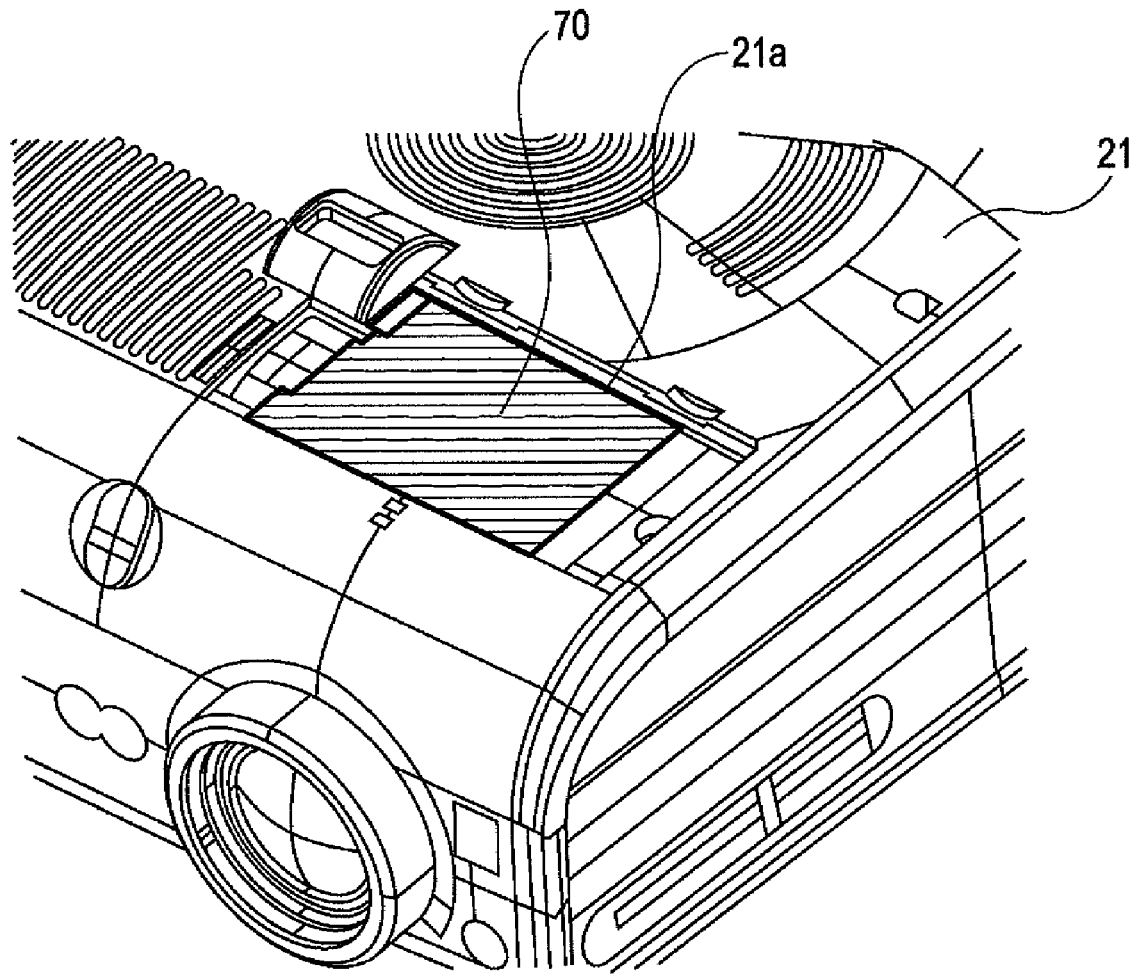
FIG. 3A is a perspective view of a first dustproof filter according to the embodiment of the present invention.
Figure 3B:
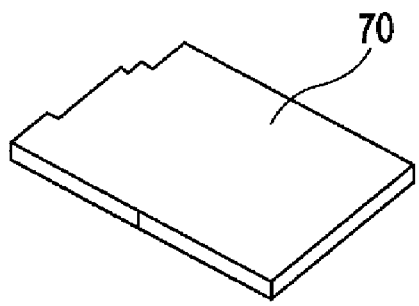
FIG. 3B illustrates the shape of the first dustproof filter.

The characteristic features of the present invention will be described below. Referring to FIG. 3A, a first dustproof filter 70 is disposed outside the air inlet 21a formed in the exterior cabinet 21 and is held by the RGB intake plate (not shown). When it is necessary to replace the first dustproof filter 70 with another filter due to adhesion of dust or the like, the RGB intake plate is detached. Accordingly, the first dustproof filter 70 can be detached or replaced with another filter from the outside of the exterior cabinet 21.

Figure 4:
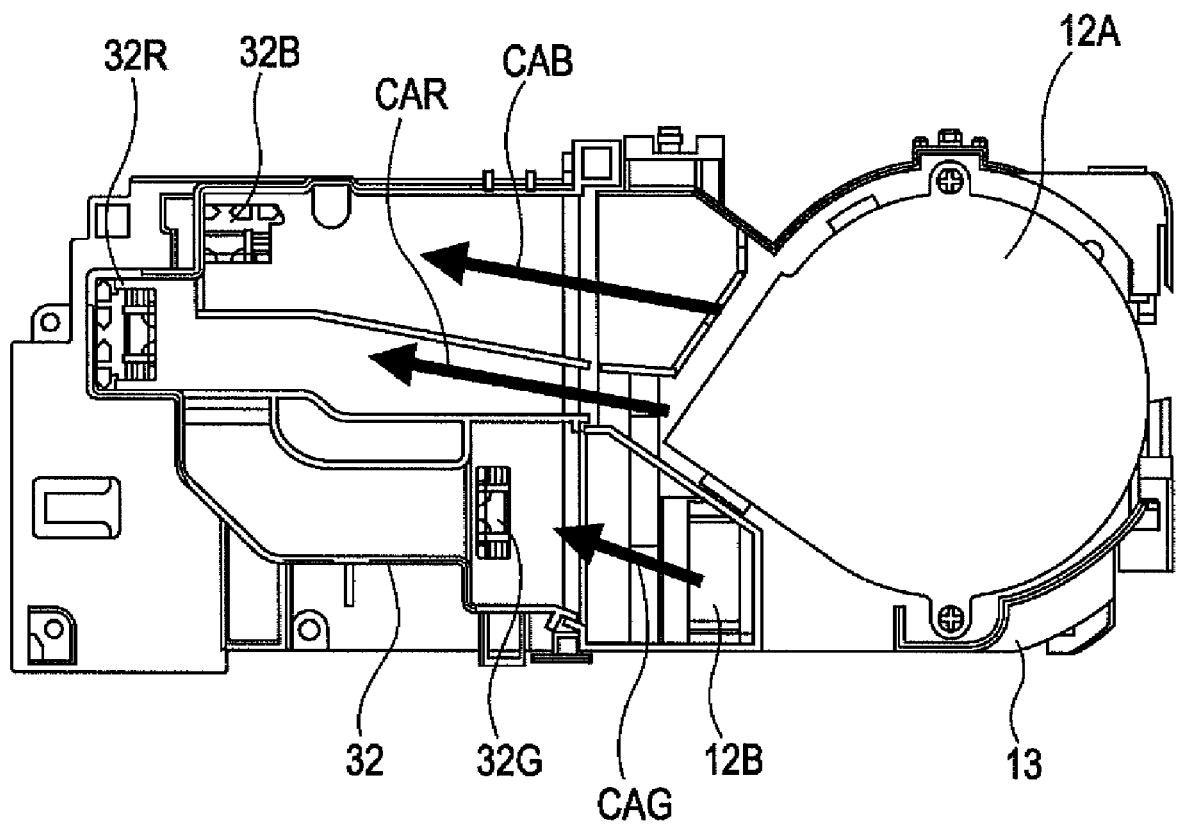
FIG. 4 illustrates the manner in which cooling air flows toward cooling-air blowing holes for blowing air toward the reflective liquid-crystal display devices and quarter-wave plates.

In FIG. 4, a cooling-air blowing hole 32R is provided for blowing air toward the R reflective liquid-crystal display device and the R quarter-wave plate. In addition, a cooling-air blowing hole 32G is provided for blowing air toward the G reflective liquid-crystal display device and the G quarter-wave plate, and a cooling-air blowing hole 32B is provided for blowing air toward the B reflective liquid-crystal display device and the B quarter-wave plate.

A cooling airflow CA that is taken in through the air inlet 21a passes through the first dustproof filter 70, and is guided toward the box side cover 32 by the optical cooling fans 12A and 12B provided in the first RGB duct 13. Then, the cooling airflow CA is divided into cooling airflows CAR, CAG, and CAB by walls provided in the first RGB duct 13 and the box side cover 32. The cooling airflows CAR, CAG, and CAB are guided toward the cooling-air blowing holes 32R, 32G, and 32B, respectively.

Figure 5:
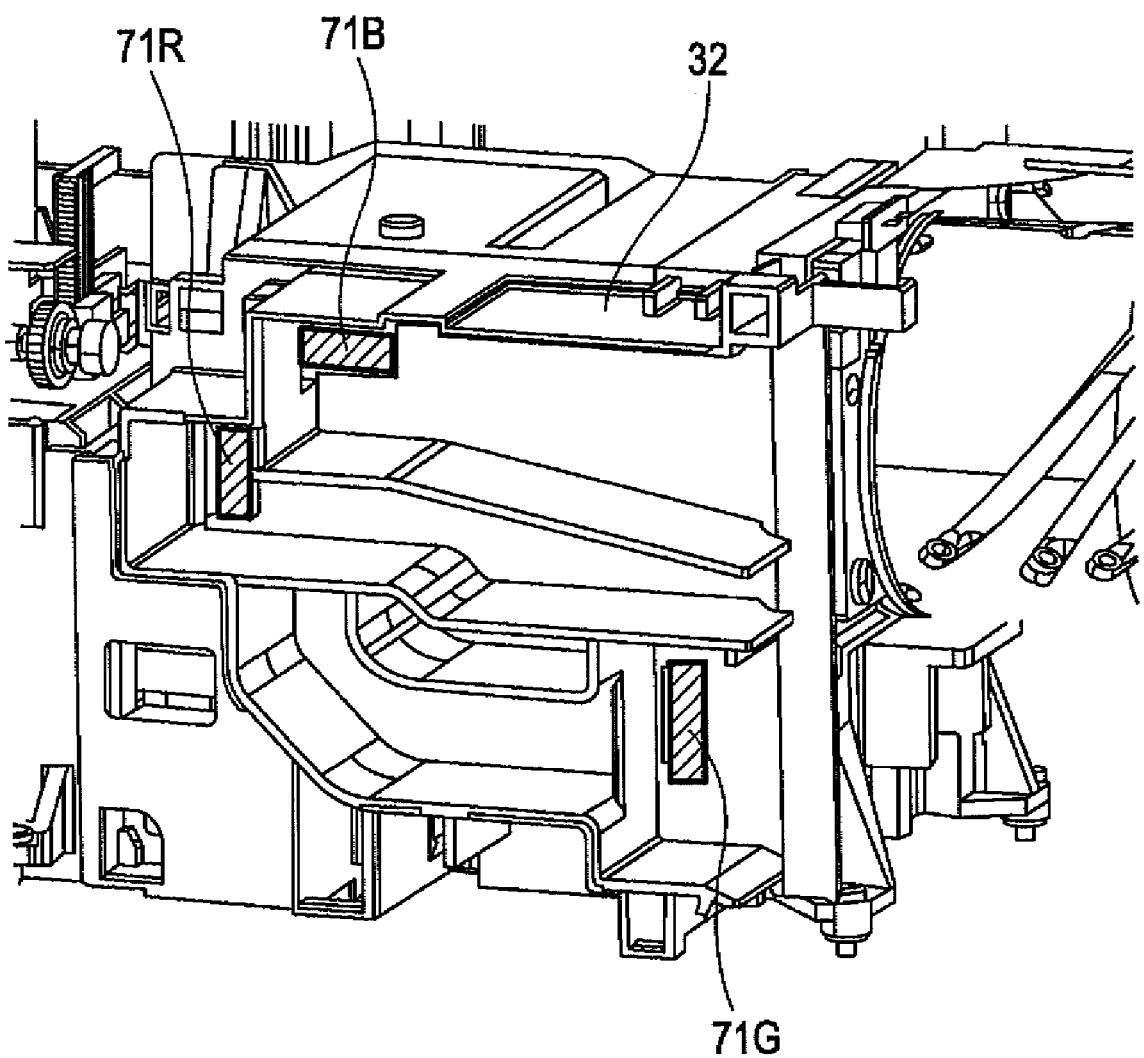
FIG. 5 illustrates second dustproof filters and sections in which the second dustproof filters are disposed.

In FIG. 5, a filter 71R for covering the cooling-air blowing hole for blowing air toward the R quarter-wave plate is provided as a second dustproof filter. In addition, a filter 71G for covering the cooling-air blowing hole for blowing air toward the G quarter-wave plate and a filter 71B for covering the cooling-air blowing hole for blowing air toward the B quarter-wave plate are also provided as second dustproof filters.

The filter 71R for covering the cooling-air blowing hole for blowing air toward the R quarter-wave plate and airflows at the upstream and downstream of the filter 71R will be described below as an example.

FIG. 6A shows the R quarter-wave plate 62R, a holder 72R for holding the R quarter-wave plate 62R, and an R optical-modulator back plate 73R. The cooling airflow CAR is supplied through the cooling-air blowing hole 32R and is divided into a cooling airflow CAR1 and a cooling airflow CAR2.

The cooling airflow CAR1 is supplied from the cooling-air blowing hole 32R and passes by the quarter-wave plate holder 72R that holds the quarter-wave plate 62R, thereby cooling the surface of the quarter-wave plate 62R. The cooling airflow CAR2 cools the optical modulator back plate 73R that holds the reflective liquid-crystal display device 61R.

Figure 6B:
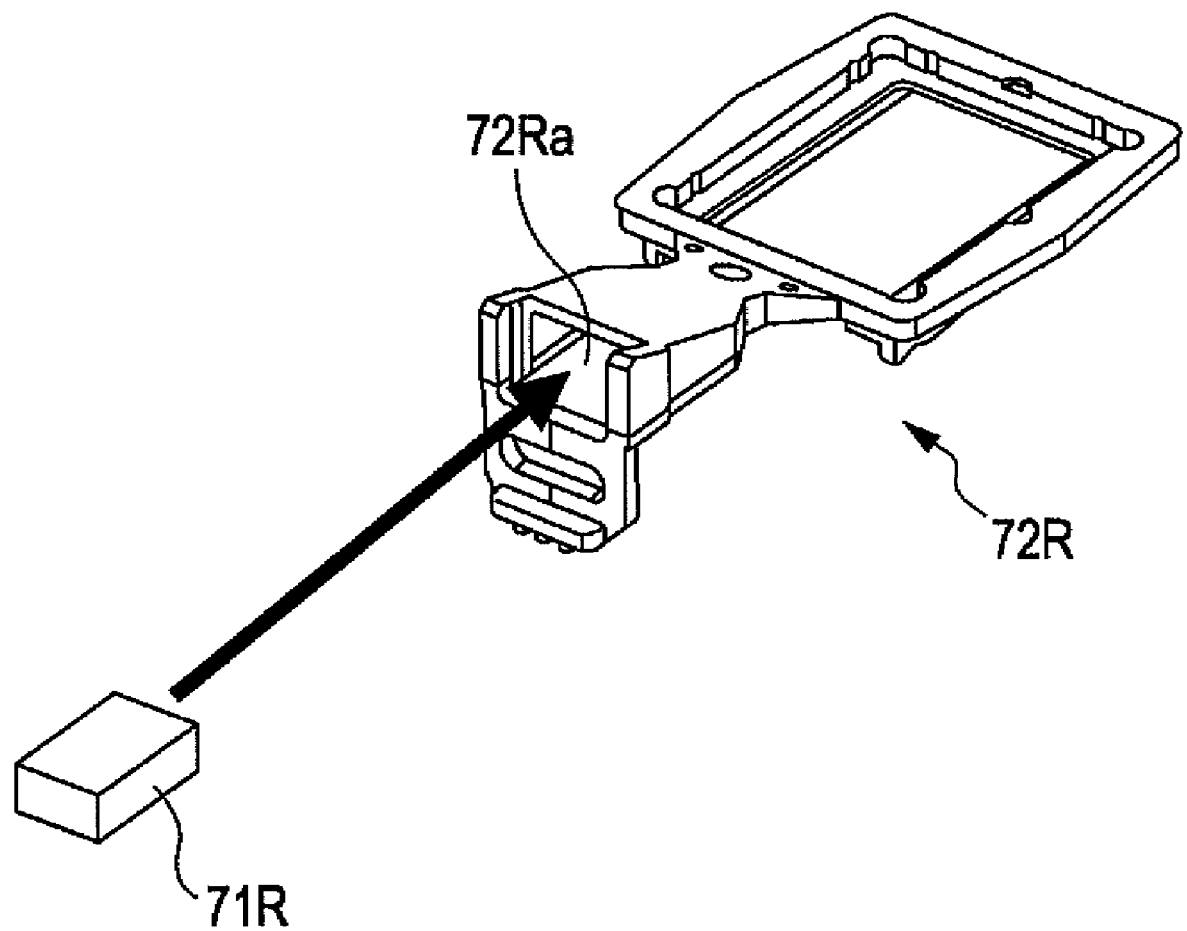
FIG. 6B illustrates the structure of a quarter-wave plate holder and the second dustproof filter inserted in a cooling-air introducing portion of the quarter-wave plate holder.

Referring to FIG. 6B, the quarter-wave plate holder 72R has a cooling-air introducing portion 72Ra.

The second dustproof filter 71R is inserted into the cooling-air introducing portion 72Ra of the quarter-wave plate holder 72R. Therefore, the cooling airflow CAR1 passes through the second dustproof filter 71R before reaching the quarter-wave plate 62R.

In the above-described structure, since the second dustproof filter 71R is provided, dust can be removed by the second dustproof filter 71R even when the first dustproof filter 70 is being replaced or fails to catch dust.

According to the present invention, dust that enters flow paths and adheres thereto in the assembly process is prevented from entering a housing unit that accommodates an optical modulator or an optical element that directly cause deterioration of image quality due to dust. Therefore, the deterioration of the image quality can be prevented.

In addition, since the first dustproof filter to which dust adheres when the apparatus is used is replaceable, the temperature in the apparatus is prevented from being increased due to clogging of the first dustproof filter. Therefore, reduction of performance can be prevented.

The cooling airflow can be divided into two airflows guided by respective flow paths toward the optical modulator or the optical element, and at least one of the flow paths may be provided with the second dustproof filter. In such a case, the dust resistance of a section that requires high resistance to dust can be increased by the second dustproof filter.

More specifically, a filter having a coarse mesh can be used as the first dustproof filter so as to increase the amount of cooling air that passes through the first dustproof filter. Thus, deterioration of image quality due to temperature increase in the apparatus can be prevented.

In addition, the second dustproof filter can be attached to the air-introducing portion of a holder for holding the optical modulator or the optical element. In such a case, the distance from the second dustproof filter to the optical modulator or the optical element can be reduced.

Accordingly, an amount of dust that adheres to a flow path that extends from the second dustproof filter to the optical modulator or the optical element can be reduced. As a result, dust can be prevented from being left in the flow path after the assembly process.

In addition, since the second dustproof filter is directly attached to the housing unit accommodating the optical modulator or the optical element, the second dustproof filter can be easily installed in the projection-type image displaying apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-030082 filed Feb. 7, 2006, which is hereby incorporated by reference herein in its entirety.

What is claimed is:

1. A projection-type image displaying apparatus that takes in outside air through an air inlet provided in a housing unit to cool at least one of an optical modulator and an optical element that are accommodated in the housing unit with the outside air, the optical modulator forming an optical image and the optical element being disposed between the optical modulator and a light source, the projection-type image displaying apparatus comprising:
   a cooling fan facilitating introduction of the outside air through the air inlet;
   a first dustproof filter disposed at the air inlet of the housing unit;
   a second dustproof filter disposed in a flow path that guides the outside air toward the optical modulator or the optical element after the outside air passes through the first dustproof filter and the cooling fan; and
   a first holder holding the optical element, the holder having an outside-air introducing portion; and
   a second holder holding the optical modulator,
   wherein the second dustproof filter is attached to the outside-air introducing portion, and
   wherein the outside air is introduced through the air inlet and the first dustproof filter by the cooling fan, is then partly guided by the flow path through the second dustproof filter and then thereafter toward the optical element, and partly guided by the flow path to the second holder without passing through the second dustproof filter to cool the second holder.

2. The projection-type image displaying apparatus according to claim 1, wherein the first dustproof filter is detachably attached from the outside of the housing unit.

3. The projection-type image displaying apparatus according to claim 1, wherein the flow path includes at least two flow paths that guide the outside air toward the optical modulator or the optical element, wherein at least one of the at least two flow paths has the second dustproof filter.

4. The projection-type image displaying apparatus according to claim 1, wherein the optical modulator includes a liquid crystal display device and the optical element includes a retardation plate.

5. The projection-type image displaying apparatus according to claim 1, wherein a plurality of the optical modulators modulate a plurality of colors of light, a plurality of the optical elements are disposed between the light source and the respective optical modulators, and
   wherein the second dustproof filter is disposed in each of flow paths that guide the outside air toward the optical modulators or the optical elements after the outside air passes through the first dustproof filter.

6. The projection-type image displaying apparatus according to claim 1, wherein the optical modulator includes a reflective liquid crystal display device.

* * * * *